(12) United States Patent
Rosca et al.

(10) Patent No.: US 9,366,582 B2
(45) Date of Patent: Jun. 14, 2016

(54) COMBINATION ISOLATION VALVE AND CHECK VALVE WITH INTEGRAL FLOW RATE, PRESSURE, AND/OR TEMPERATURE MEASUREMENT

(71) Applicant: Fluid Handling LLC., Morton Grove, IL (US)

(72) Inventors: Florin Rosca, Niles, IL (US); Glenn E. Huse, Green Oaks, IL (US); Stanley P. Evans, Tinley Park, IL (US)

(73) Assignee: FLUID HANDLING LLC., Morton Grove, IL (US)

( * ) Notice: Subject to any disclaimer, the term of this patent is extended or adjusted under 35 U.S.C. 154(b) by 0 days.

(21) Appl. No.: 14/301,485

(22) Filed: Jun. 11, 2014

(65) Prior Publication Data

US 2014/0360604 A1    Dec. 11, 2014

Related U.S. Application Data

(60) Provisional application No. 61/833,638, filed on Jun. 11, 2013.

(51) Int. Cl.

| | |
|---|---|
| *F16K 17/00* | (2006.01) |
| *G01F 1/00* | (2006.01) |
| *G01K 13/02* | (2006.01) |
| *F16K 37/00* | (2006.01) |
| *G01F 15/00* | (2006.01) |
| *G01F 15/06* | (2006.01) |
| *F24D 3/10* | (2006.01) |
| *F24D 19/10* | (2006.01) |

(52) U.S. Cl.
CPC .............. *G01K 13/02* (2013.01); *F16K 17/003* (2013.01); *F16K 37/0091* (2013.01); *F24D 3/1083* (2013.01); *F24D 19/1048* (2013.01); *G01F 1/00* (2013.01); *G01F 15/005* (2013.01); *G01F 15/063* (2013.01); *G01K 2201/00* (2013.01); *Y10T 137/86485* (2015.04)

(58) Field of Classification Search
CPC ... F16K 17/003; F16K 37/0091; F16K 49/00; F16K 21/00; G01F 1/00; G01F 15/00; G01L 7/00; G01K 13/02; Y10T 137/86485
USPC ................ 137/613, 614.2, 563, 564
See application file for complete search history.

(56) References Cited

U.S. PATENT DOCUMENTS

| | | |
|---|---|---|
| 3,819,846 A | 6/1974 | Jakobsen |
| 3,854,497 A | 12/1974 | Rosenberg |

(Continued)

*Primary Examiner* — Kevin Lee

(57) ABSTRACT

A combination valve includes an isolation shutoff valve to prevent a fluid flow; a check valve to prevent backflow and gravity circulation of fluid flow; a pressure sensor to sense a pressure measurement of fluid flow and determine pressure sensor signaling containing information about a sensed pressure measurement; a temperature sensor to sense a temperature measurement of fluid flow and determine temperature sensor signaling containing information about a sensed temperature measurement; and a flow measurement sensor to sense a flow measurement of fluid flow and determine flow measurement signaling containing information about a sensed flow measurement. The pressure sensor, temperature sensor and flow measurement sensor are all embedded and preassembled in the combination valve with the isolation shutoff valve and the check valve as part of one integral composite unit or component, so as to form a combination isolation valve and check valve with integral flow rate, pressure and/or temperature measurement.

12 Claims, 1 Drawing Sheet

(56) References Cited

U.S. PATENT DOCUMENTS

| | | | |
|---|---|---|---|
| 4,189,095 A | 2/1980 | Monigold et al. | |
| 4,314,673 A | 2/1982 | Rudelick | |
| 4,571,008 A | 2/1986 | Wickham | |
| 4,581,944 A | 4/1986 | Obermann et al. | |
| 5,542,450 A * | 8/1996 | King et al. | B67D 7/20 137/334 |
| 5,551,479 A | 9/1996 | Graves | |
| 5,853,020 A | 12/1998 | Widner | |
| 6,766,651 B2 | 7/2004 | Dillenback | |
| 6,886,595 B2 | 5/2005 | James et al. | |
| 6,983,889 B2 | 1/2006 | Alles | |
| 7,445,025 B2 | 11/2008 | Shafique et al. | |
| 7,478,540 B2 | 1/2009 | Flynn et al. | |
| 7,478,761 B2 | 1/2009 | Karamanos et al. | |
| 7,664,573 B2 | 2/2010 | Ahmed | |
| 7,720,574 B1 * | 5/2010 | Roys | G01F 15/063 700/281 |
| 7,726,582 B2 | 6/2010 | Federspiel | |
| 8,330,617 B2 | 12/2012 | Chen et al. | |
| 8,393,875 B2 | 3/2013 | Prescott | |
| 2011/0214767 A1 * | 9/2011 | Laing | F16K 11/078 137/625.4 |
| 2012/0046792 A1 | 2/2012 | Secor | |
| 2012/0209195 A1 | 8/2012 | Kamen et al. | |

\* cited by examiner

COMBINATION ISOLATION VALVE AND CHECK VALVE WITH INTEGRAL FLOW RATE, PRESSURE, AND/OR TEMPERATURE MEASUREMENT

CROSS-REFERENCE TO RELATED APPLICATIONS

This application claims benefit to provisional application Ser. No. 61/833,638, filed 11 Jun. 2013, which is hereby incorporated by reference in its entirety.

BACKGROUND OF THE INVENTION

1. Field of the Invention

The present invention relates to a valve; and more particularly, relates to a combination valve for use in a hydronic HVAC system.

2. Brief Description of Related Art

An increasing number of today's hydronic heating, ventilation and air conditioning (HVAC) systems utilize variable frequency drives and variable speed pumps. Most of such systems require shut-off and check valves and flow measurement devices that are either permanently or temporarily installed to verify the system flow rate. When permanently installed in a hydronic HVAC system these flow measurement devices take up extra space and increase the system head loss. Significant amounts of extra pipe length may be required depending on the type of flow measurement device being used.

When employed, non-permanent means of flow rate measurement can be labor intensive and, depending on the type of technology used, present a varying degree of accuracy, data portability, and opportunities for water leakage.

There is a need in the industry for a way to solve this problem in the art.

SUMMARY OF THE INVENTION

The present invention provides for a new and unique apparatus that features a combination valve having an isolation shutoff valve, a check valve, a pressure sensor, a temperature sensor and a flow measurement sensor.

The isolation shutoff valve may be configured to prevent a fluid flow.

The check valve may be configured to prevent backflow and gravity circulation of the fluid flow.

The pressure sensor may be configured to sense to a pressure measurement of the fluid flow and determine pressure sensor signaling containing information about a sensed pressure measurement.

The temperature sensor may be configured to sense a temperature measurement of the fluid flow and determine temperature sensor signaling containing information about a sensed temperature measurement.

The flow measurement sensor may be configured to sense a flow measurement of the fluid flow and determine flow measurement signaling containing information about a sensed flow measurement.

The pressure sensor, temperature sensor and flow measurement sensor are all embedded and preassembled in the combination valve with the isolation shutoff valve and the check valve as part of one integral composite unit or component, so as to form a combination isolation valve and check valve with integral flow rate, pressure and/or temperature measurement.

The present invention may include one or more of the following additional features:

The pressure sensor may be configured to provide the pressure sensor signaling, the temperature sensor is configured to provide the temperature sensor signaling, and the flow measurement sensor is configured to provide the flow measurement signaling; and the apparatus may further include a wireless data transmission unit or circuitry, configured to respond to the pressure sensor signaling, the temperature sensor signaling and the flow measurement signaling, and provide corresponding sensor signaling containing information about the same.

The apparatus may further include a pump configured to provide the fluid flow to the combination valve; and a pump controller having a corresponding wireless data transmission unit or circuitry configured to respond to the corresponding signaling and provide a pump control signal to the pump in order to adjust the performance of the pump and meet desired system requirements related to the fluid flow, including where the apparatus includes an HVAC system coupled between the pump and the combination valve.

The combination valve may be configured to provide a single head loss location.

The wireless data transmission unit or circuitry and corresponding wireless data transmission unit or circuitry may be combined into a continuous input/output feedback loop, including where flow rate, pressure and/or temperature are inputs and pump performance parameters are desired outputs.

The wireless data transmission unit or circuitry and corresponding wireless data transmission unit or circuitry may be configured to be paired using wireless signaling.

The pressure sensor, temperature sensor and flow measurement sensor may be embedded into the valve combination so as to substantially eliminate the possibility of leakage, based at least partly on the fact that there are no probes inserted.

According to some embodiments, the present invention may also take the form of a combination valve that includes an isolation shutoff configured to prevent a fluid flow, a check valve configured to prevent backflow and gravity circulation of the fluid flow, a pressure sensor configured to sense to a pressure measurement of the fluid flow and provide pressure sensor signaling containing information about a sensed pressure measurement, a temperature sensor configured to sense a temperature measurement of the fluid flow and provide temperature sensor signaling containing information about a sensed temperature measurement, and a flow measurement sensor configured to sense a flow measurement of the fluid flow and provide flow measurement signaling containing information about a sensed flow measurement; and data transmission module, configured to respond to the pressure sensor signaling, the temperature sensor signaling and the flow measurement signaling, and provide corresponding signaling containing information about the same.

In the combination valve, the pressure sensor, the temperature sensor and flow measurement sensor may be hard wired to the wireless data transmission unit or circuitry for providing associated sensor signaling; or the pressure sensor, the temperature sensor and flow measurement sensor may be configured to provide the associated sensor signaling to the wireless data transmission unit or circuitry via wireless signaling; or the wireless data transmission unit or circuitry may be configured to provide the corresponding signaling via wireless signal, including to a pump controller for controlling a pump, consistent with that set forth herein.

BRIEF DESCRIPTION OF THE DRAWING

The drawing includes the following Figures, not drawn to scale.

DETAILED DESCRIPTION OF THE INVENTION

Overview of Present Invention

Figure 1:
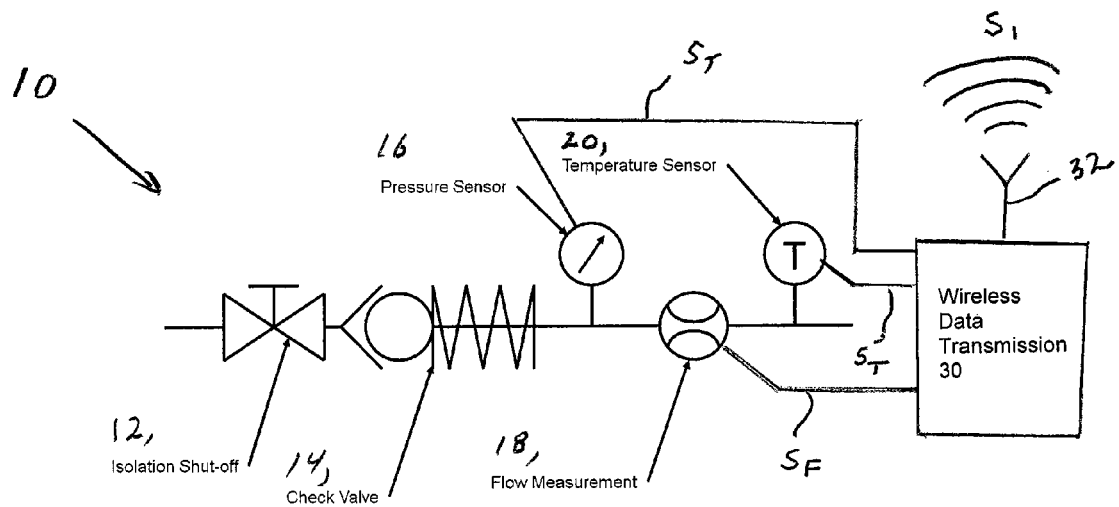
FIG. 1 is a diagram of a combination valve, according to some embodiments of the present invention.
Figure 2:
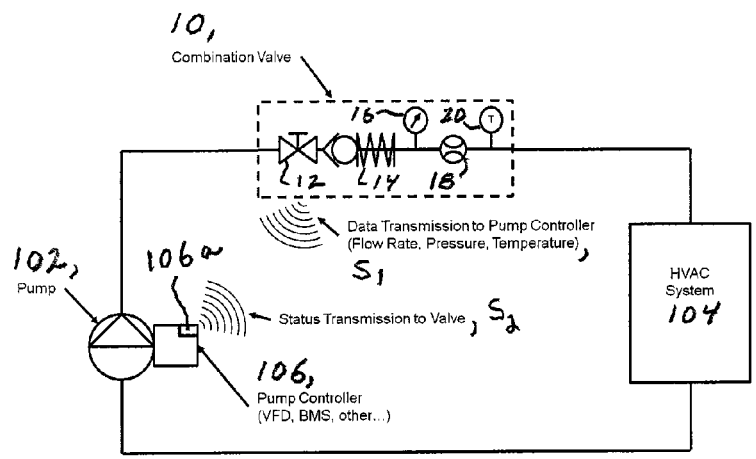
FIG. 2 is a diagram of the combination valve shown in FIG. 1 arranged in a system loop with a pump and an HVAC system, according to some embodiments of the present invention.

FIG. 1 shows a combination valve generally indicated as 10 that may be used in, or form part of, a hydronic HVAC system generally indicated as 100. The combination valve 10 may be configured to include an isolation valve 12; a check valve 14; and as a means and/or sensors 16, 18 and 20 for measuring fluid parameters, such as pressure, flow rate, and/or temperature, consistent with that shown in FIG. 1. The hydronic HVAC system 100 may be configured to include e.g., a pump 102, an HVAC system 104 and a pump controller 106 for controlling the operation of the pump 102. The present invention allows or provides for the combination valve 10 in the hydronic HVAC system 100 to function as a combined isolation valve; a check valve; and as a means for measuring fluid parameters, such as flow rate, pressure, and/or temperature, consistent with that shown in FIG. 1. The flow rate, pressure, and/or temperature sensors 16, 18, 20 are configured to be embedded in the combination valve 10. These sensors 16, 18, 20 also feature a method of transmitting information related to such fluid parameter to one or more various HVAC system controls, e.g., such as the pump controller 106. Based on the data collected at the combination valve 10, a signal $S_1$ may be transmitted to a control device, e.g., a pump control 106, that will enable the HVAC system loop pump 102 to adjust its performance and meet the desired system requirements, e.g., consistent with that shown in FIG. 2. Specifically, continuous flow rate, pressure, and temperature measurements taken at the combination valve 10 may be transmitted via signals $S_1$ by a wireless data transmission unit, circuitry or device 30 to a corresponding wireless data transmission unit, circuitry or device 106a that is a paired device interfacing with, or forming part of, the pump controller 106. The pump controller 106 may include, or take the form of, a system's controller, e.g., including variable frequency drive (VFD) circuit or circuitry; a building management system (BMS); or other such control device. The system or pump controller 106 may be configured to vary the power supplied to the pump 102 and thus adjust pump's performance. This unique sensed data exchange technique creates a continuous input/output (I/O) feedback loop where the flow rate, pressure, and/or temperature are the inputs and the pump performance parameters are the desired outputs. Alternatively, the data can also be transmitted to a handheld device or a remote location for instant evaluation.

The new combination of the isolation valve 12, check valve 14, with embedded sensors 16, 18, 20 for flow rate, pressure, and/or temperature measurements, provides a more compact product envelope that achieves space savings, by eliminating the need for all these completely separate components in an HVAC system, such as separate isolation valves, check valves, flow meters, pressure gages, and/or thermometers. The continuous I/O feedback loop between the integral sensors of the combination valve and the control or controller device of the pump ensure that maximum energy is saved as the pump and system always run at the desired optimal condition.

According to some embodiments of the present invention, this combination valve 10 will incorporate all of these features in as compact an envelope as possible to save space and energy when installed. Flow rate, pressure, and/or temperature measurement features that are embedded into this combination valve will eliminate the possibility of leakage that normally exists when probes are inserted into the valve or system accessory to measure the internal fluid pressure or temperature. Likewise, this combination valve will produce a single head loss location for system design considerations.

When acting as a positive shut-off isolation valve, the combination valve 10 will prevent fluid flow so that maintenance can be performed on the pump or system. When acting as a check valve, the combination valve 10 will prevent backflow and gravity circulation, which is harmful to pump or system operation when it occurs.

Flow measurement may occur, e.g., through an embedded electromagnetic, electromechanical, or mechanical flow measurement device used in possible combination with the pressure and/or temperature measurements. These sensors 16, 18 and 20 may be configure to provide real-time data that can be captured by the pump or system controller 106 to record conditions for the user. In some embodiments, data collected at the combination valve 10 may be wirelessly transmitted to the paired wireless transmission unit, circuitry or device 106a via wireless signals $S_1$ that interfaces with the pump or system controller 106 (VFD, BMS, or other) and the pump 102. By way of example, the data collected at the combination valve 10 may be provided from the pressure sensor 16, the flow measurement sensor 18 and temperature sensor 20 via hardwiring signaling along lines $S_T$, $S_F$, $S_T$ to a wireless data transmission unit or device 30 having an antenna 32, or respective wireless signaling, and the wireless data transmission unit or device 32 may provide via the antenna 32 the wireless signals $S_1$ to the pump or system controller 106. In this example, the pressure sensor 16, the flow measurement sensor 18 and temperature sensor 20 may be hardwired to the wireless data transmission unit or device 32, or may be configured to provide wireless signaling to the wireless data transmission unit or device 32. Alternatively, embodiments are also envisioned in which the pressure sensor 16, the flow measurement sensor 18 and temperature sensor 20 are configured to separately provide wireless data directly to the pump or system controller 106.

In addition, the pump or system controller 106 may likewise be configured to wirelessly transmit status updates via signals $S_2$ to the combination valve 10. The pump or system controller 106 may direct the pump 102 to increase or decrease speed as required to satisfy optimal system conditions. In an alternative embodiment, a wired connection may be used to transmit the data between the combination valve 10 and the pump or system controller 106.

Pump Controller 106

According to the present invention, the pump controller 106 may include a signal processor or signal processing module that may be configured to receive the signals $S_1$ (see FIGS. 1 and 2), determine suitable pump controller signaling to control the pump 102, and/or to provide corresponding pump controller signaling containing information about the same, based at least partly on the signals $S_1$ received. By way of example, the corresponding pump controller signaling may contain information in order to adjust the performance of the pump and meet desired system requirements related to the fluid flow, consistent with that set forth herein.

The signal processor may also be configured with a processor and at least one memory device including computer program code, the at least one memory device and the computer program code configured to, with the at least one processor, cause the signal processor at least to implement the signal processing functionality of the apparatus set forth above. A person skilled in the art would understand and appreciate how to implement such a signal processor to perform the aforementioned signal processing functionality without undue experimentation.

By way of example, the functionality of the signal processor may be implemented using hardware, software, firmware, or a combination thereof. In a typical software implementation, the signal processor would include one or more microprocessor-based architectures having at least one microprocessor, random access memory (RAM), read only memory (ROM), input/output devices and control, and data and address buses connecting the same. A person skilled in the art would be able to program such a microcontroller (or microprocessor)-based implementation to perform the functionality described herein without undue experimentation. The scope of the invention is not intended to be limited to any particular implementation using technology either now known or later developed in the future.

Valves, Sensors and Wireless Data Transmission Units or Circuitry

Isolation shutoff valves, check valves, pressure sensors, temperature sensors and flow measurement sensors are individually known in the art, and the scope of the invention is not intended to be limited to any particular type or kind thereof either now known or later developed in the future.

In addition, wireless data transmission units or circuitry is also known in the art, and the scope of the invention is not intended to be limited to any particular type or kind thereof either now known or later developed in the future.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing and figures herein are not necessarily drawn to scale.

The scope of the invention is not intended to be limited to any particular type or kind of pumps either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. Apparatus comprising:
a combination valve comprised of:
an isolation shutoff valve configured to prevent a fluid flow;
a check valve configured to prevent backflow and gravity circulation of the fluid flow;
a pressure sensor configured to sense to a pressure measurement of the fluid flow and determine pressure sensor signaling containing information about a sensed pressure measurement;
a temperature sensor configured to sense a temperature measurement of the fluid flow and determine temperature sensor signaling containing information about a sensed temperature measurement; and
a flow measurement sensor configured to sense a flow measurement of the fluid flow and determine flow measurement signaling containing information about a sensed flow measurement;
the pressure sensor, the temperature sensor and the flow measurement sensor all being embedded and preassembled in the combination valve with the isolation shutoff valve and the check valve as part of one integral composite unit or component, so as to form a combination isolation valve and check valve with integral flow rate, pressure and/or temperature measurement.

2. Apparatus according to claim 1, wherein
the pressure sensor is configured to provide the pressure sensor signaling, the temperature sensor is configured to provide the temperature sensor signaling, and the flow measurement sensor is configured to provide the flow measurement signaling; and
the apparatus further comprises a wireless data transmission unit or circuitry configured to respond to the pressure sensor signaling, the temperature sensor signaling and the flow measurement signaling, and provide corresponding sensor signaling containing information about the pressure sensor signaling, the temperature sensor signaling and the flow measurement signaling.

3. Apparatus according to claim 2, wherein the apparatus further comprises:
a pump configured to provide the fluid flow to the combination valve; and
a pump controller having a corresponding wireless data transmission unit or circuitry configured to respond to the corresponding sensor signaling and provide a pump control signal to the pump in order to adjust the performance of the pump and meet desired system requirements related to the fluid flow.

4. Apparatus according to claim 3, wherein the apparatus comprises an HVAC system coupled between the pump and the combination valve.

5. Apparatus according to claim 1, wherein the combination valve is configured to provide a single head loss location.

6. Apparatus according to claim 3, wherein the wireless data transmission unit or circuitry and the corresponding wireless data transmission unit or circuitry combined to a continuous input/output feedback loop, including where flow rate, pressure and/or temperature are inputs and pump performance parameters are desired outputs.

7. Apparatus according to claim 3, wherein the wireless data transmission unit or circuitry and the corresponding wireless data transmission unit or circuitry are configured to be paired using wireless signaling.

8. Apparatus according to claim 1, wherein the pressure sensor, temperature sensor and flow measurement sensor are embedded into the combination valve so as to substantially eliminate the possibility of leakage.

9. A combination valve comprising:
an isolation shutoff configured to prevent a fluid flow,
a check valve configured to prevent backflow and gravity circulation of the fluid flow,
a pressure sensor configured to sense to a pressure measurement of the fluid flow and provide pressure sensor signaling containing information about a sensed pressure measurement,
a temperature sensor configured to sense a temperature measurement of the fluid flow and provide temperature sensor signaling containing information about a sensed temperature measurement, and a flow measurement sensor configured to sense a flow measurement of the fluid flow and provide flow measurement signaling containing information about a sensed flow measurement;

the pressure sensor, the temperature sensor and the flow measurement sensor all being embedded and preassembled in the combination valve with the isolation shutoff valve and the check valve as part of one integral composite unit or component, so as to form a combination isolation valve and check valve with integral flow rate, pressure and/or temperature measurement; and a wireless data transmission unit or circuitry, configured to respond to the pressure sensor signaling, the temperature sensor signaling and the flow measurement signaling, and provide corresponding signaling containing information about the pressure sensor signaling, the temperature sensor signaling and the flow measurement signaling.

10. A combination valve according to claim 9, wherein the pressure sensor, the temperature sensor and flow measurement sensor are hard wired to the wireless data transmission unit or circuitry for providing associated hard wired sensor signaling.

11. A combination valve according to claim 9, wherein the pressure sensor, the temperature sensor and flow measurement sensor are configured to provide associated sensor signaling to the wireless data transmission unit or circuitry via wireless signaling.

12. A combination valve according to claim 9, wherein the wireless data transmission unit or circuitry is configured to provide the corresponding signaling via wireless signal, including to a pump controller for controlling a pump.

* * * * *